United States Patent [19]

Hasegawa et al.

[11] Patent Number: 4,775,926

[45] Date of Patent: Oct. 4, 1988

[54] APPARATUS FOR CORRECTING DISPLACEMENT OF MOVABLE MEMBERS OF MACHINE TOOLS

[75] Inventors: Satoru Hasegawa, Mishima; Isao Wakamiya, Nagaizumi, both of Japan

[73] Assignee: Toshiba Kikai Kabushiki Kaisha, Tokyo, Japan

[21] Appl. No.: 102,779

[22] Filed: Sep. 23, 1987

Related U.S. Application Data

[63] Continuation of Ser. No. 932,467, Nov. 18, 1986, abandoned, which is a continuation-in-part of Ser. No. 620,153, Jun. 13, 1984, abandoned.

[30] Foreign Application Priority Data

Jun. 29, 1983 [JP] Japan ................................ 58-117955

[51] Int. Cl.$^4$ ............................................. G05B 19/19
[52] U.S. Cl. ................................ 364/167.01; 364/476; 364/474.35
[58] Field of Search ............... 364/167, 170, 474, 475, 364/476, 472, 513, 571

[56] References Cited

U.S. PATENT DOCUMENTS

| | | | |
|---|---|---|---|
| 3,970,830 | 7/1976 | White et al. | 364/474 |
| 4,356,554 | 10/1982 | Susnjara et al. | 364/513 |
| 4,455,789 | 6/1984 | Gehring | 51/165.9 |
| 4,486,840 | 12/1984 | Klein et al. | 364/476 |
| 4,490,944 | 1/1985 | Veale | 51/165.71 |
| 4,514,796 | 4/1985 | Saulters et al. | 364/142 |
| 4,527,244 | 7/1985 | Graham et al. | 364/474 |

Primary Examiner—John R. Lastova
Attorney, Agent, or Firm—Koda and Androlia

[57] ABSTRACT

In apparatus for correcting displacement of a movable member of a machine tool wherein the effect caused by the displacement of the movable member is corrected by a correction load applying device supplied with pressurized fluid, there is provided a position detector for detecting the position of the movable member to produce a position signal, a displacement correction value calculator for calculating a displacement correction value in accordance with the position signal for producing a displacement correction signal, and an electromagnetic valve supplied with the displacement correction signal for adjusting the pressure of the pressurized fluid.

2 Claims, 5 Drawing Sheets (a)

(b)

(c)

(d)

APPARATUS FOR CORRECTING DISPLACEMENT OF MOVABLE MEMBERS OF MACHINE TOOLS

CROSS REFERENCE TO RELATED APPLICATION

This application is a continuation of application Ser. No. 932,467, filed Nov. 18, 1986, now abandoned, which is a continuation-in-part of a copending application Ser. No. 620,153, filed June 13, 1984, now abandoned.

BACKGROUND OF THE INVENTION

This invention relates to apparatus for correcting displacement of a movable member or a supporting member for slidably supporting the movable member, of a machine tool, for example, and more particularly to apparatus for optimumly correcting displacement of the movable member in accordance with the position thereof after it has been moved to that position (hereinafter, this position is called a moved position).

Such machine tools as a horizontal boring machine, a horizontal milling machine, a draw cut shaper and a diesinking machine are provided with a movable member, for example a ram, and a supporting member slidably supporting the same, for example a spindle head. In such machine tools, such displacements occur caused by deflection of the ram when the ram is advanced or a large tool or attachment is mounted on the ram, or by inclination of the spindle head due to change of the position of the center of gravity of the spindle head.

To attain high accuracies of the machining of the machine tool, it is necessary to correct or compensate for these displacements and various types of displacement correction means have been used. For example, Japanese Laid-Open Patent Specification No. 2185/1965 discloses a balancing apparatus provided with means for compensating for the variation in the position of the center of gravity wherein the oil pressure supplied to an oil pressure cylinder provided for a balance weight is varied in accordance with the forward movement of the ram for the purpose of automatically preventing variation in the moment caused by the variation of the position of the center of gravity of the spindle head. Furthermore, Japanese Laid-Open Patent Specification No. 38827/1975 discloses ram stress compensating apparatus wherein a tension bar is embedded in the upper portion of the ram and the rear end of the tension bar is pulled by an oil pressure cylinder assembly so as to compensate for the deflection of the ram. According to another approach, oil pockets are formed at the front and rear ends of the lower surface of the ram sliding surface of the spindle head and pressurized oil is admitted into these pockets for always maintaining the gaps between the front and rear ends and the ram sliding surface at a constant value so as to correct the inclination of the ram in accordance with the difference in the gaps. According to still another approach, oil pressure cylinders are provided for the upper and lower portions of the front end of the spindle head for correcting the deflection of the front lower portion of the spindle head.

In these displacement correction apparatus, the oil pressure of a pump is adjusted in accordance with the quantity of advance of the ram by means of a pressure regulating valve so as to correct the displacement of the spindle head or ram by supplying pressure regulated oil to oil pressure cylinders. As the pressure adjusting valve has been used a balanced piston type valve including a pilot valve capable of independently adjusting the oil pressure (secondary pressure) supplied to the oil pressure cylinder from two directions. More particularly, adjusting screws are provided for both ends of a pilot valve, one of the adjusting screws being coupled with a ram feed shaft through a gear mechanism so as to rotate the adjusting screw in an interlocked relation with the movement of the ram, thus automatically adjusting the secondary pressure, while the other adjusting screw being connected directly to the adjusting dial of the spindle head so that when a tool or an attachment is mounted on the ram or spindle shaft, the adjusting screws are rotated with an adjusting dial, thereby preadjusting the initial pressure by an amount equal to the variation in the position of the center of gravity of the spindle head caused by the weight thereof.

As above described, according to the prior art displacement correcting apparatus, balanced piston type pressure adjusting valves are used and an adjusting screw provided for one end of a pilot valve is rotated at a predetermined ratio for adjusting the oil pressure. With such method of adjusting, the oil pressure can be adjusted only at a certain constant ratio in accordance with the amount of advance of the ram and it has been impossible to change the percentage of adjustment on the way of advancing the ram. More particularly, the percentage of pressure adjustment (pressure characteristic) of the balanced piston type pressure adjusting valve is principally determined by the force of a spring so that it is necessary to exchange the spring in order to change the characteristic.

Generally speaking, the amount of advance of the ram is not always related, at a definite ratio, to the deflection of the ram or the variation in the position of the center of gravity of the spindle head and as the amount of advance of the ram increases, the amount of displacement tends to increase rapidly. This tendency is particularly remarkable when a tool or an attachment of a large weight is mounted on the front end of the ram or spindle shaft. Accordingly, with the prior art displacement correction apparatus utilizing the balanced piston type pressure adjusting valve which can adjust the pressure only at a constant ratio, it is impossible to provide an optimum displacement adjustment at all advanced positions of the ram. In other words, satisfactory correction can be made only at a specific position or range. Consequently, in a large floor type boring machine, a machine tool mounted with a large attachment or a machine tool having a large stroke of the ram, it has been difficult to obtain a high degree of machining accuracy.

Moreover, it has been necessary to manually adjust the pressure adjusting valve whenever additional load varies as in the case of exchanging the attachment. This not only requires troublesome and time consuming adjustments but also requires assembling while a mechanical coupling adapted to operate the pressure adjusting valve is being adjusted, thus increasing the number of steps required for assembling the displacement correction apparatus.

SUMMARY OF THE INVENTION

Accordingly, it is an object of this invention to provide displacement correction apparatus for a movable member especially suitable for machine tools of various types and capable of optimumly correcting a displacement caused by the movements of the component elements of the machine over substantially the entire range of movement.

Another object of this invention is to provide a novel displacement correction apparatus capable of optimumly correcting displacement in accordance with an attachment, tool or the like mounted on the machine tool.

DESCRIPTION OF THE PREFERRED EMBODIMENT

Figure 1:
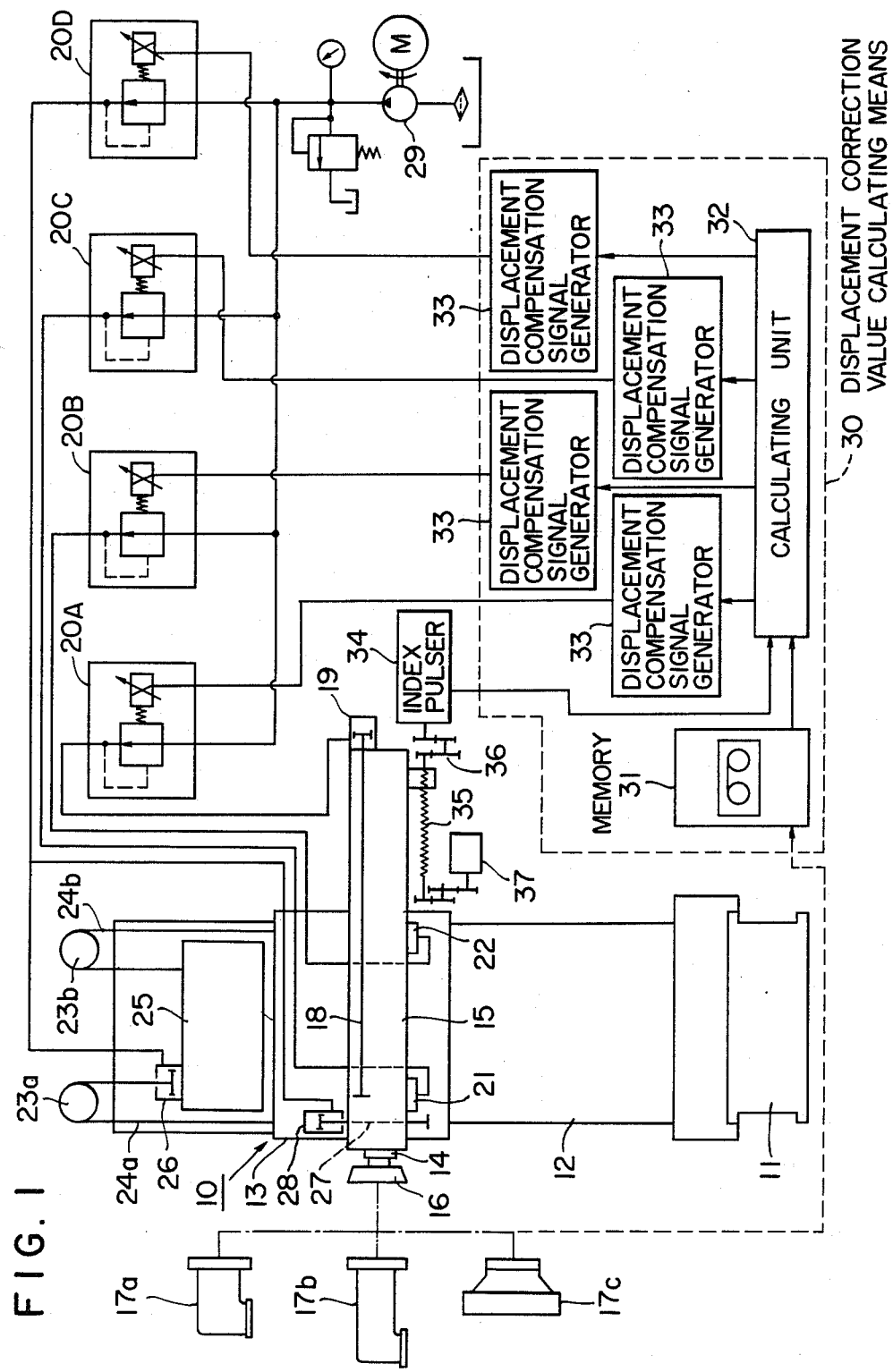
FIG. 1 is a block diagram showing one embodiment of this invention.

FIG. 1 is a block diagram showing one embodiment of this invention applied to a horizontal boring machine 10 comprising a bed 11, a vertical column 12 mounted thereon to be movable in the horizontal direction (a direction perpendicular to the sheet of drawing) and a spindle head 13 mounted on the column 12 to be movable in the vertical direction. A ram 15 rotatably supporting a spindle 14 is supported by the spindle head to be slidable in the axial direction. As the ram 15 is advanced for machining a workpiece, not shown, the ram deflects due to the weight thereof as well as the weight of a tool or attachments 17a, 17b and 17c mounted on the front end of the ram, thus causing such displacement as the inclination of the spindle head 13 as a whole or the elastic deformation of the front lower end of the spindle head. For this reason for the purpose of correcting these displacements, correction load imparting devices are provided for the movable portions of the ram 15 and spindle head 13 for imparting thereto correction loads corresponding to the amount of advance of the ram 15. The correction load imparting devices include a ram stress compensating device for correcting the deflection of the ram, an inclination compensation device for correcting the inclination of the ram caused by the difference in the gaps at the front and rear ends of the ram sliding surface of the spindle head, a device for compensating for the variation in the position of the center of gravity so as to correct the inclination caused by the movement of the position of the center of gravity of the spindle head, and a spindle head stress compensating device for correcting the elastic deformation of the front lower portion of the spindle head. More particularly, the ram stress compensating device comprises a longitudinal tension bar 18 embedded in the upper portion of ram 15, and an oil pressure piston cylinder assembly 19 connected to the rear end of tension bar 18. When pressurized oil for effecting correction is introduced into the piston cylinder assembly 19, the tension bar 18 is pulled thereby correcting the flexure of the ram 15. The inclination compensation device comprises oil pockets 21 and 22 at the front and rear ends beneath the ram sliding surface of the spindle head 13 and the pressurized oil of a pressure corresponding to the advanced position of the ram 15 is supplied to the oil pockets 21 and 22 so as to maintain the gaps at the front and rear ends of the ram sliding surface always at a constant value, thus correcting the inclination of the ram 15. The center of gravity position variation compensating device comprises a balance weight 25 connected to the opposite ends of the spindle head 13 through pulleys 23a and 23b and chains or ropes 24a and 24b so as to hang the spindle head, and a piston cylinder assembly 26 connected to the front side chain 24a.

When pressurized oil having a pressure corresponding to the amount of advance of ram 15 is supplied to the piston cylinder assembly 26, the tension of chain 24a is increased so as to maintain the spindle head 13 always in a horizontal position. The spindle head stress compensation device comprises a clamping bar 27 embedded in the front end of the spindle head 13 and extending in a direction perpendicular to the axis of ram 15 between upper and lower portions of the ram, and a piston cylinder assembly 28 connected to the upper end of the clamping bar 27. When pressurized oil of a pressure corresponding to the amount of advance of the ram is supplied to the piston cylinder assembly 28, the ram supporting member of the spindle head 13 is pulled upwardly thereby compensating for the elastic deformation of the front lower portion of the spindle head 13. This compensating device can also be provided for the rear end of the spindle head 13 for compensating for the deformation of the spindle head 13 when the ram is retracted.

These correction load imparting devices are operated by the pressurized oil supplied from a pressurized oil supply source, that is an oil pump 29 and the output pressure thereof is controlled by a proportional electromagnetic type pressure control valve to a predetermined value. More particularly, the oil pressure cylinder 19 of the ram stress compensating apparatus is connected to the oil pump 29 via a proportional electromagnetic type pressure control valve 20A, while the oil pockets 22 and 21 at the rear end and front end of the inclination compensation device are connected to the oil pump 29 via a proportional electromagnetic type pressure control valves 20B and 20C, respectively. The oil pressure cylinder 26 of the center of gravity position variation compensating device and the oil pressure cylinder 28 of the spindle head stress compensating device are connected to the oil pump 29 through a proportional electromagnetic type pressure control valve 20D. The reason that the piston cylinder assembly 26 of the center of gravity position variation compensating device and the piston cylinder assembly 28 of the spindle head stress compensating device commonly utilize the proportional electromagnetic type pressure control valve 20D lies in that the characteristics of the correction oil pressures supplied to both cylinders 26 and 28 are similar. Of course, discrete proportional electromagnetic type control valves can also be used.

The proportional electromagnetic type pressure control valve is constructed such that a pilot valve is controlled by a solenoid so that the oil pressure supplied to the correcting load imparting device (secondary pressure) can be controlled in proportion to current flowing through the solenoid, the current being applied as a displacement correction signal outputted from a displacement correction value calculating means 30. This calculating means 30 is constituted by a memory unit 31 which stores calculation programs prepared for such conditions as the type or presence or absence of tool 16 or attachments 17a, 17b and 17c mounted on the front end of ram 15, a calculating unit 32 which arithmetically processes a position signal produced by the ram advanced position detector according to a predetermined calculation program and displacement compensation signal generators 33 which convert the result of calculations into displacement correction signals supplied to respective proportional electromagnetic pressure control valves.

As the ram advanced position detector may be used an index pulser 34, for example, which is rotated by a gear train 36 provided at one end of a ball screw 35 for feeding the ram and the pulse generated by the index pulser 34 is detected as a position signal. In addition to these detectors, a potentiometer resistor, an encoder or resolver can be used as the position detector. Alternatively, the position detector can be coupled to an electric motor 37 for driving the ram feed ball screw 35 so as to obtain a position signal from the rotational position of the motor 37.

According to the calculation program, the relation between the displacements of the ram and spindle head caused by the forward movement of the ram which can be calculated or measured and the correction load necessary to correct the displacements are obtained by an equation for calculating the correction oil pressure supplied to the oil pressure cylinders of respective displacement correction devices and oil pockets, as will be discussed later in detail, and the calculated values are stored in the memory device 31. Furthermore, the calculation programs are prepared for respective types by taking into consideration such factors as the weights of the tool and attachments mounted on the front end of the ram. Alternatively, the variation of the weight or the like can be corrected by using a specific correction coefficient for calculating each type.

Ideally, the equation for calculating the correction oil pressure should be a calculating equation of higher order functions obtained by theory or experiment in order that the displacement can be perfectly compensated for at all points in the stroke of the ram, or approximate calculation can also be used, wherein for the purpose of simplifying the calculation, the advanced position of the ram is divided into a plurality of ranges and an equation of calculating a function of relatively lower order (for example, the first order) applicable to each range is used for performing an approximate calculation of the oil pressure necessary for providing perfect correction. More particularly, relatively satisfactory correction may be made by varying the oil pressure for correction at a constant rate in a given range, but in the next range the oil pressure can be varied at a different constant rate, whereby it is possible to maintain a high working accuracy not to impair the quality of the products. As will be described later, according to this embodiment, the ram stroke is divided into three regions, and the equations for calculating the correcting oil pressure are made different for respective regions so that as the amount of the forward movement of the ram increases the rate of increase in the oil pressure for correction is caused to increase, thereby coping with the tendency of increasing actual displacement. Furthermore an equation of calculating the correction oil pressure represented by a relatively simple function of the first order can be used.

Examples of calculations effected by various compensating devices are as follows.

A.
RAM STRESS COMPENSATING DEVICE (Device for compensating flexure of the ram itself)

Figure 4:
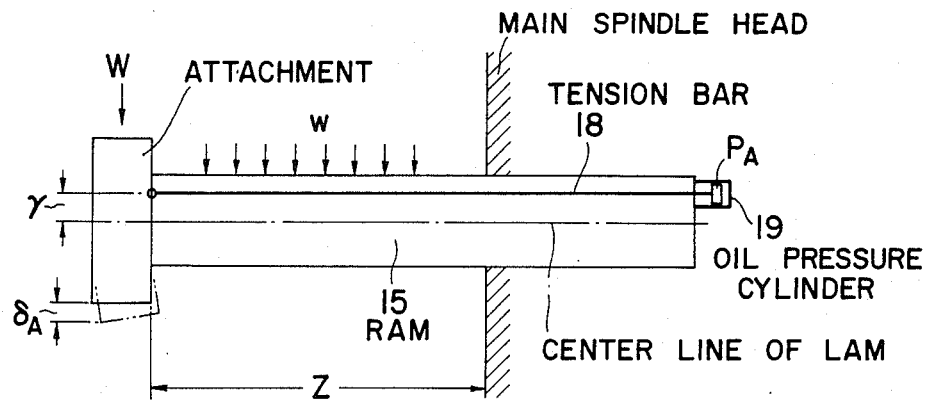
FIGS. 4~7 are schematic representations utilized in the calculations to be described later.

In FIG. 4 showing the ram and the attachment,

W: Weight of the attachment (Kg)
w: Weight of a unit length of the ram (Kg/mm)
Z: Amount of advance of the ram (mm)
$\gamma$: Displacement of the tension bar from the center line of the ram (mm)
$\delta_A$: Flexure of the front end of the ram (mm)
$P_A$: Oil pressure supplied to oil pressure cylinder 19 (Kg/mm$^2$)

Then we can obtain the following equations, (1) Tension F of tension bar 18 (kg)

$$F = P_A \times A \qquad (1)$$

where
A = cross-sectional area of oil pressure cylinder 19 (mm$^2$)

(2) Bending moment M (Kg-mm) of the ram caused by the tension of the tension bar.

$$M = F \times \gamma = P_A \times A \times \gamma \qquad (2)$$

(3) Flexure $\delta_A$(mm) of the front end of the ram caused by the weights of the attachment and ram.

$$\delta_A = \frac{WZ^3}{3EI} + \frac{wZ^4}{8EI} \qquad (3)$$

where
E represents Young's modulus
I: sectional secondary moment (4) Flexure $S_{A0}$(mm) of the front end of the ram caused by bending moment M $$\delta_{A0} = \frac{M}{2EI} Z^2 = \frac{P_A \times A \times y}{2EI} Z^2 \qquad (4)$$

(5) A condition for making zero the flexures of the front end of the ram $$\delta_A = \delta_{A0}$$

Substituting equations 3 and 4

$$\frac{W}{3EI} Z^3 + \frac{w}{8EI} Z^4 = \frac{P_A \cdot A \cdot y}{2EI} Z^2 \qquad (5)$$

$$\frac{W}{3} Z + \frac{w}{8} Z^2 = \frac{P_A \cdot A \cdot y}{Z}$$

$$\therefore P_A = \frac{2}{A \cdot y} \left( \frac{w}{8} Z^2 + \frac{W}{3} Z \right) = C_1 Z^2 + C_2 Z$$

where $$C_1 = \frac{w}{4Ay}, \quad C_2 = \frac{2W}{3Ay},$$

and $C_1$ and $C_2$ are determined by the type of the attachment.

B.

INCLINATION COMPENSATING DEVICE (A device for compensating for the inclination of the ram caused by the difference between the gaps between the front and rear ends of the ram sliding surface of the spindle head)

Figure 5:
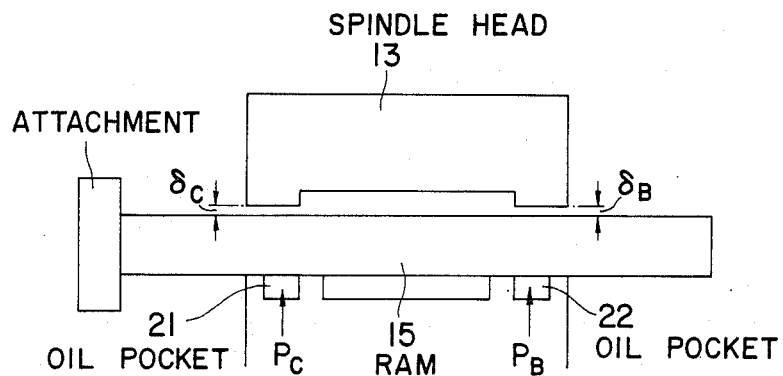

As diagrammatically shown in FIG. 5 this device makes zero the difference $\Delta\delta$ between the gaps $\delta_B$ and $\delta_C$, that is $\Delta\delta = \delta_C - \delta_B = 0$ by supplying pressure oils respectively at pressures $P_C$ and $P_B$ to oil pockets 21 and 22.

In FIG. 5

$P_B$: Correction oil pressure supplied to oil pocket 22 at the rear end of the ram sliding surface $P_C$: Correction oil pressure supplied to oil pocket 21 at the front end of the ram sliding surface $\delta_B$: Gap between ram 15 and spindle head 13 at the rear end of the ram sliding surface $\delta_C$: Gap between ram 15 and spindle head 13 at the front end of the ram sliding surface Since the gaps are proportional to the amount of advance (first order proportionality)

$$\delta_B = -C_3 Z + C_4$$

$$\delta_C = C_5 Z + C_6$$

where $C_3$, $C_4$, $C_5$ and $C_6$ are constants determined by the type of the attachment.

Consequently, the oil pressures $P_B$ and $P_C$ are shown by the following first order equations $$P_B = -C_7 Z + C_8 \qquad (6)$$

$$P_C = C_9 Z + C_{10} \qquad (7)$$

where $C_7$ through $C_{10}$ are constants determined by the type of the attachment.

C.

DEVICE FOR COMPENSATING FOR THE CENTER OF GRAVITY POSITION VARIATION (Device for compensating for the inclination caused by the center of gravity position variation of the spindle head)

Figure 6:
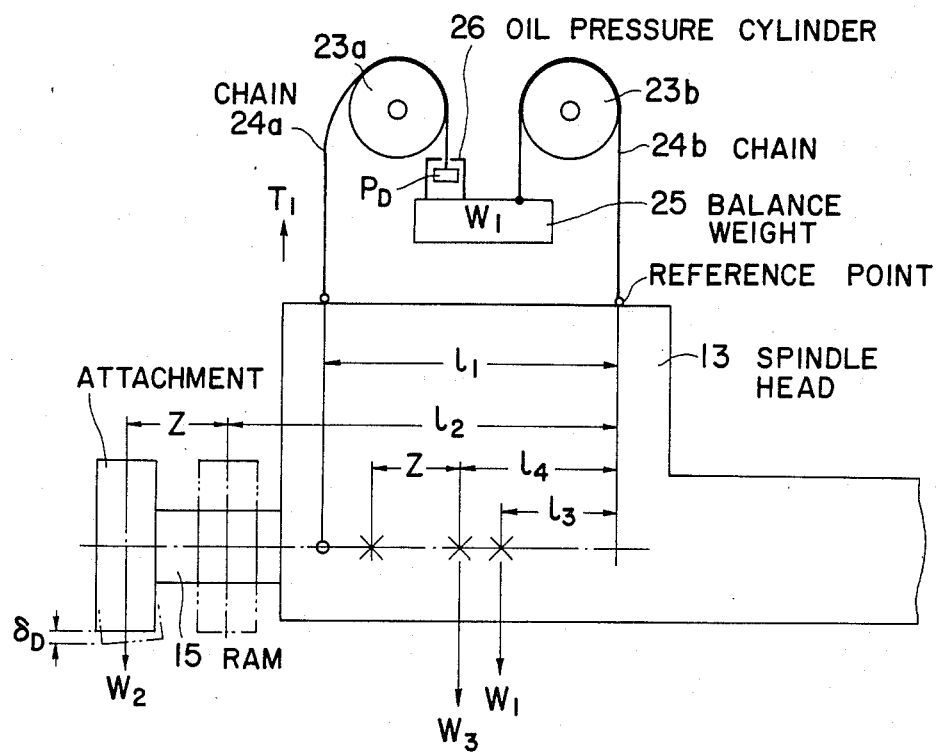

This device will be described with reference to FIG. 6 in which $W_1$: Weights of the spindle head 13 and of the balancing weight 25 (Kg)

$W_2$: Weight of the attachment (Kg)

$W_3$: Weight of ram 15 (Kg)

$T_1$: Tension of chain 24a (Kg)

$l_1$: Distance between a reference point and a position of the spindle head 13 at which tension $T_1$ is applied (mm)

$l_2$: Distance between the reference point and a position of the spindle head 13 to which the ram 15 has been retracted (mm)

$l_3$: Distance between the reference point and the position of the center of gravity of the spindle head 13 (mm)

$l_4$: Distance between the reference point and the ram center of gravity position when the ram is in the retracted position (mm)

$\delta_D$: Deflection of the front end of the ram caused by the inclination of the spindle head (mm)

$P_D$: Oil pressure supplied to oil pressure cylinder 26 (Kg/mm$^2$)

The tension $T_1$ of the chain necessary for making zero the flexure $\delta_D$ is shown by $$T_1 l_1 = W_1 l_3 + W_2(l_2 + Z) + W_3(l_4 + Z) \qquad 8$$

Hence $$\begin{aligned} T_1 &= 1/l_1 \{W_1 l_3 + W_2(l_2 + Z) + W_3(l_4 + Z)\} \\ &= 1/l_1 \{(W_2 + W_3)Z + (W_1 l_3 + W_2 l_2 + W_3 l_4)\} \end{aligned}$$

Further $$T_1 = P_D \times A \qquad 9$$

From equations 8 and 9

$$\begin{aligned} P_D &= 1/Al_1\{(W_2 + W_3)Z + (W_1 l_3 + W_2 l_2 + W_3 l_4)\} \\ &= C_{11} Z + C_{12} \end{aligned} \qquad (10)$$

where $$C_{11} = \frac{W_2 + W_3}{Al_1}$$

$$C_{12} = \frac{W_1 l_3 + W_2 l_2 + W_3 l_4}{Al_1}$$

and $C_{11}$ and $C_{12}$ are constants determined by the type of the attachment.

D.

DEVICE FOR COMPENSATING FOR THE STRESS OF THE SPINDLE HEAD (Device for compensating for the elastic deformation of the front lower portion of the spindle head)

Figure 7:
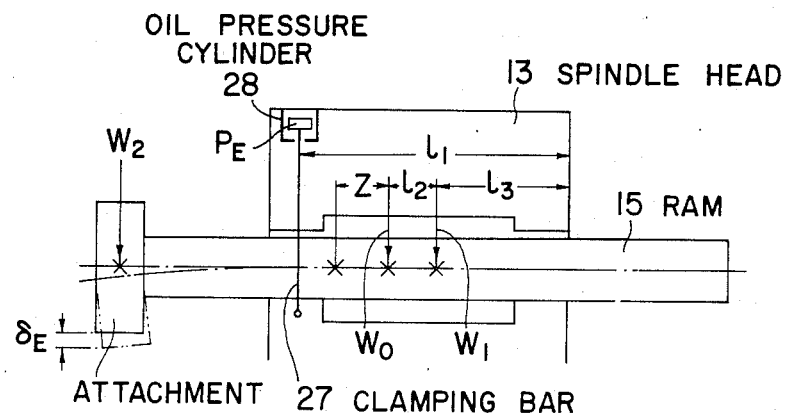

This device will be described with reference to FIG. 7 in which $W_0$: $W_2 + W_3$ (Kg)

$W_2$: Weight of the attachment (Kg)

$W_3$: Ram weight (Kg)

$l_1$: Distance between the rear end of the spindle head 13 and clamping bar 27 (mm)

$l_2$: Distance between the position of center of gravity of the sum of the attachment and the ram and the position of the center of gravity (mm) when the ram is in the retracted position $l_3$: Distance between the rear end of the spindle head and the position of the center of gravity of the ram when the ram is in the retracted position (mm)

$P_E$: Correction oil pressure supplied to oil pressure cylinder 28 (Kg/mm$^2$)

$\delta_E$: Flexure of the front end of the ram caused by the elastic deformation of the front lower portion of the spindle head (mm)

The oil pressure $P_E$ supplied to the oil pressure cylinder 28 for making zero $\delta_E$ is expressed by $$P_E \times A \times l_1 = (l_3 + l_2 + Z) W_0$$

where
A represents the cross-sectional area of the oil pressure cylinder 28.

$$\therefore P_E = \frac{l_3 + l_2}{Al_1} W_0 + \frac{W_0}{Al_1} Z$$
$$= C_{13}Z + C_{14}$$

where $$C_{13} = \frac{W_0}{Al_1}, \quad C_{14} = \frac{l_3 + l_2}{Al_1} W_0,$$

and $C_{13}$ and $C_{14}$ show constants determined by the type of the attachment.

In the embodiment described above, the correction oil pressure $P_E$ is equal to that $P_D$ of the center of gravity variation compensating device.

Summarizing the above, correction oil pressures are

A. For the ram stress compensating device $$P_A = C_1 Z^2 + C_2 Z \qquad 5$$

B. For the inclination compensating device $$P_B = -C_7 Z + C_8 \qquad 6$$

$$P_C = C_9 Z + C_{10} \qquad 7$$

C. For the compensation device for the center of gravity position variation $$P_D = C_{11} Z + C_{12} \qquad 10$$

D. For the spindle head stress compensation device $$P_E = C_{13} Z + C_{14} \qquad 11$$

It will be noted that compensations are made by making $P_D = P_E$.

Among these equations for calculating oil pressures, equation 5 is a second order function equation but an approximate value of the oil pressure $P_A$ can be calculated with a first order function equation. Furthermore, as above described, various constants C are determined by the type of the attachment.

Figure 2:
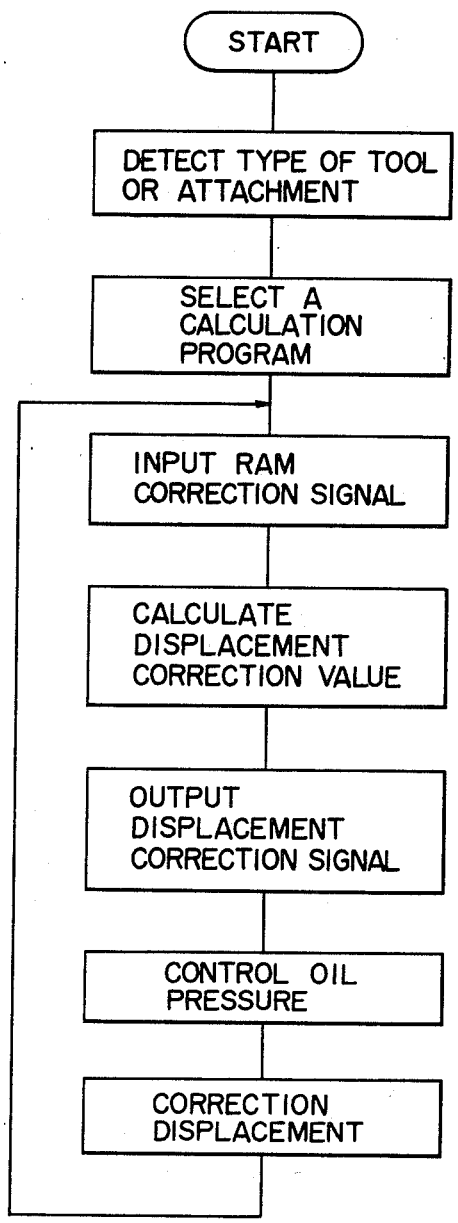
FIG. 2 is a flow chart showing successive steps of displacement correction according to this invention.

The operation of the embodiment described above will now be described with reference to the flow chart shown in FIG. 2. Prior to the operation, the type of a tool or attachment mounted on the front end of the ram is inputted to the memory means for calculating the displacement correction value for selecting a corresponding calculation program. This selection can be made by manually operating a push button, or by mounting a plurality of detection switches on the attachment mounting surface of the ram and by causing irregular shaped codes provided for the attachments for respective types thereof to actuate the switches or by detecting the switches installed to be engaged by dogs carried by the ram when the attachments are mounted, thereby automatically detecting the types of the attachment according to the types, combinations or positions of the detection switches engaged by the dogs. Further, it is possible to select a desired calculation program by utilizing a selection operation of the tool or attachment and an instruction signal requiring automatic exchange.

As the ram 15 commences to advance, the index pulser 34 sends to the calculating unit 32 a pulse acting as the position signal of ram 15. Then the calculating circuit 32 processes this position signal according to a selected calculation program to calculate a displacement correction value which is converted into displacement correction signals that is current signals by displacement correction signal generators 33, the displacement correction signals being sent to proportional electromagnetic type pressure control valves 20A, 20B, 20C and 20D. In each of these control valves, the displacement correction signal controls a pilot valve to convert the oil pressure (primary pressure) sent from oil pump 29 into a desired oil pressure (secondary pressure). The correction oil pressure is supplied to the piston cylinder assemblies of respective compensating devices or oil pockets to actuate respective correction devices for providing desired displacement corrections. The corrections of displacements of the ram 15 and the spindle head 13 caused by the advancement of the ram can be continuously and efficiently effected.

Figure 3:
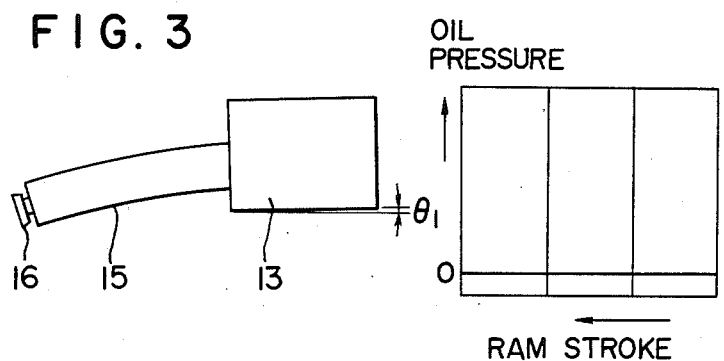
FIGS. 3a~3d are graphs for explaining the advantage of this invention.
Figure 3:
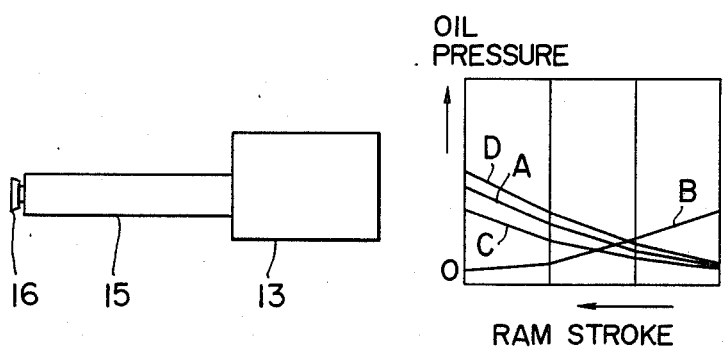
Figure 3:
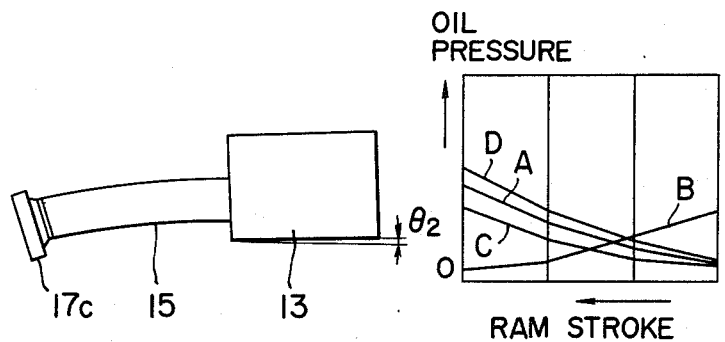
Figure 3:
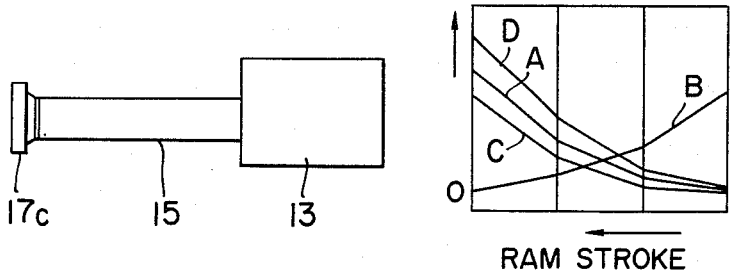

FIGS. 3a~3d are diagrammatic representations showing the results of corrections of the flexure of ram 15 and inclination of spindle head 13 effected by the displacement correction devices of this invention. The lefthand sides of FIGS. 3a~3c show the states of displacements of the ram 15 and the spindle head 13 when the ram is advanced, while the righthand sides the relationships between the stroke or advancement of the ram and the correction oil pressure.

In the state shown in FIG. 3a, a tool 16 is mounted on the front end of ram 15 and the correction oil pressure is zero. Under this state in which the displacement correction device is not actuated, not only the ram 15 deflects but also the spindle head 13 inclines by an angle $\theta_1$.

FIG. 3b shows a state after the displacements shown in FIG. 3a have been corrected by the displacement correcting device of this invention. The correction oil pressure is changed in proportion to the amount of advance (stroke) of the ram but it should be noted that the rate of change is varied at an intermediate point of the stroke of the ram. More particularly, the stroke is divided into three regions in this example, and the rate of increase of the correction oil pressure at the initial stage is made to be larger than that of the last stage. In FIG. 3b, A, B, C and D show oil pressures controlled by the proportional electromagnetic type pressure control valves 20A, 20B, 20C and 20D (see FIG. 1), respectively. The correction oil pressure B supplied to the oil pocket 22 at the rear end of the spindle head 13 functions to compensate for the inclination of the rear end of the spindle head 13 when the ram 15 has retracted so that curve B is inclined in the opposite direction with respect to other curves A, C and D.

FIG. 3c shows the result of corrections of the displacements of the ram 15 mounted with attachment 17c and the spindle head 13 effected by supplying the correction oil pressure in the same manner as in FIG. 3b. As can be noted from FIG. 3c, where attachment 17c is mounted, the deflection of ram 15 as well as the inclination of the spindle head caused by the weight of the attachment increase so that when the correction oil pressure is controlled in the same manner as in the case wherein the tool 16 is mounted, so that it is impossible to completely compensate for the deflection of the ram and the inclination $\theta_2$ of the spindle head 13.

FIG. 3d shows the result of correction effected by selecting a calculation program corresponding to attachment 17c and the correction oil pressure calculated with the selected calculation program is used. As can be noted from comparison of FIG. 3d with FIG. 3c, the curves showing the correction oil pressure when the attachment is mounted have steeper slopes than those of a case where a tool lighter than the attachment is mounted so that the rate of change of the correction oil pressure with reference to the stroke of the ram is large. Especially, the difference is remarkable near the end of the forward stroke of the ram. As above described, where a suitable calculation program is selected in accordance with the type of the tool or attachment for calculating and supplying optimum correction oil pressure, precise correction of the displacement can be made.

Although in the foregoing description, 4 types of the compensation devices were illustrated as the correction load applying devices, it should be understood that any one or combinations of the compensating devices can be used depending upon the weight of a ram, a tool or attachment. For example, in a machine tool of relatively small size and weight, the stress compensating device and the inclination compensating device may be omitted. For a machine tool of large size and weight, it is necessary to increase the number of tension bars 18 of the ram stress compensating device and to provide the clamp bar 27 of the spindle head stress compensating device also beneath the spindle head. It is also possible to use other correction load imparting devices having the same or similar performances as those described above.

Instead of using oil pressure as the means for imparting a correction load, other fluid pressure, for example pneumatic pressure or hydraulic pressure can be used. Furthermore, in the foregoing embodiment, a correction oil pressure calculating equation depicting 3 types of curves for the entire stroke of the ram was used to control the oil pressure, but where the type is increased correction of displacement can be made at higher accuracies.

When the displacements of the ram and spindle head are detected during actual machining and where the detected displacements are fed back to the calculating means as feedback signals for correcting the calculation of the displacement correction value, the accuracy can be improved. Where the accuracy of the proportional electromagnetic type pressure control valve is not sufficiently high, the correction oil pressure is detected after it has been controlled and by feeding back the detected pressure to the calculating means the accuracy of compensation can be improved.

Where correction coefficients corresponding to the types of the works and the number of revolutions of the spindle are included in the displacement correction calculating program in addition to the correction coefficients corresponding to the types of the tool and the attachment, the displacement correction can be made based on much more factors.

As above described, according to this invention a required correction load can be calculated and imparted to a movable element of a machine at various positions of movement so that an optimum displacement correction can be made corresponding to the position of the movable member. Furthermore, as it is possible to change the rate of change of the correction load for the amount of movement of the movable member at an intermediate point in the stroke of the movable member, the accuracy of the displacement correction can be greatly improved than a prior art displacement correction device which cannot vary the correction load at a constant proportional relationship with respect to the entire stroke of the movable member. This effect is especially remarkable in a large machine tool having a large stroke.

Moreover, it is possible to select an optimum displacement correction calculating program in accordance with the type of the tool and attachment which are mounted on the movable member so as to improve the accuracy of displacement correction. Such selection of the calculation program can be made in an interlocked relation with the exchange of the tool and attachment, thus making fully automatic operation of a machine tool.

In addition to a machine tool of the type described above, the invention is also applicable to a gate type or arched machining center having a spindle center slidable along a cross-bar with both ends supported by vertical columns.

What is claimed is:

1. An apparatus for correcting displacement of a ram of a horizontal boring machine including a vertical column, a spindle head slidable along said vertical column, and a horizontal ram slidably supported by said spindle head and adapted to support a tool or an attachment, said apparatus comprising:
   a source of pressurized fluid,
   a valve means for adjusting pressure of said pressurized fluid;
   means for applying a correction load including:
   (1) a ram stress compensating device for correcting deflection of said ram;
   (2) an inclination compensating device correcting inclination of said ram;
   (3) a center of gravity position compensating device for correcting inclination of said spindle head caused by a movement of a center of gravity position of said spindle head;
   (4) a spindle head stress compensating device for correcting elastic deformation of a front or rear lower portion of said spindle head; and
   (5) a plurality of pressurized fluid actuators for being supplied with correction oil pressure for respectively actuating said compensating devices (1) through (4);
   means for detecting a position of said ram to produce a position signal,
   said valve means comprising a plurality of proportional electromagnetic type pressure control valves respectively supplying said correction oil pressure to respective pressurized fluid actuators,
   a calculating unit calculating displacement compensation values in response to said position signal for supplying displacement compensation signals to said proportional electromagnetic type pressure control valves respectively, said calculating unit including means for calculating correction oil pressures $P_A$, $P_B$, $P_C$, $P_D$ and $P_E$ expressed by the following equations:
   A. for the ram stress compensating device $$P_A = C_1 Z^2 + C_2 Z$$

B. for the inclination compensating device $P_B = -C_7 Z + C_8$ $P_C = C_9 Z + C_{10}$ C. for the compensation device for the center of gravity position variation $P_D = C_{11} Z + C_{12}$ D. for the spindle head stress compensation device $P_E = C_{13} Z + C_{14}$ where Z represents an amount of advance of said ram and $C_1$, $C_2$, $C_7$–$C_{14}$ are constants determined by a type of said tool or attachment, and means for supplying electric signals corresponding to calculated correction oil pressures $P_A$–$P_E$ to said plurality of proportional electromagnetic type pressure control valves respectively, and memory means for storing an operation program of said calculating unit and connected to said calculating unit.

2. An apparatus according to claim 1, wherein a forward stroke of said ram is divided into a plurality of sections, and said calculating unit calculates the valve of said displacement compensation signals with equations of relatively low orders applicable to respective sections.

* * * * *